US012699702B2

(12) United States Patent
Mahmoud et al.

(10) Patent No.: US 12,699,702 B2
(45) Date of Patent: Aug. 4, 2026

(54) PROVIDING IMAGE CONTEXT FOR INFORMATION RETRIEVAL

(71) Applicant: Rakuten Mobile, Inc., Tokyo (JP)

(72) Inventors: Yaqub Abdullahi Mahmoud, Tokyo (JP); Mehari Yohannes Hailemariam, Tokyo (JP); Nazeeruddin Mohammed, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 11 days.

(21) Appl. No.: 18/955,976

(22) Filed: Nov. 22, 2024

(65) Prior Publication Data

US 2026/0147765 A1     May 28, 2026

(51) Int. Cl.
| | |
|---|---|
| *G06F 16/2457* | (2019.01) |
| *G06F 16/22* | (2019.01) |
| *G06F 16/51* | (2019.01) |
| *G06V 30/164* | (2022.01) |

(52) U.S. Cl.
CPC .... *G06F 16/24573* (2019.01); *G06F 16/2237* (2019.01); *G06F 16/51* (2019.01); *G06V 30/164* (2022.01)

(58) Field of Classification Search
CPC .......... G06F 16/24573; G06F 16/2237; G06F 16/51; G06F 16/3347; G06V 30/164; G06V 10/806; G06V 30/40; G06V 30/10

USPC ....... 707/608, 737, 741, 783, 812, 722, 736, 707/749, 755, 756, 802, 712, 713, 707/999.004
See application file for complete search history.

(56) References Cited

U.S. PATENT DOCUMENTS

| | | | | |
|---|---|---|---|---|
| 6,708,309 | B1 * | 3/2004 | Blumberg ............... | G06T 11/00 |
| | | | | 715/209 |
| 2005/0025390 | A1 * | 2/2005 | Tsujii ..................... | G16H 30/20 |
| | | | | 600/300 |
| 2024/0355104 | A1 * | 10/2024 | Alfassy ............ | G06V 30/19173 |
| 2025/0156639 | A1 * | 5/2025 | Sinha .................... | G06V 30/416 |
| 2025/0298840 | A1 * | 9/2025 | Gong ................... | G06F 16/538 |
| 2025/0315492 | A1 * | 10/2025 | Lyer .................... | G06F 16/9538 |
| 2026/0004110 | A1 * | 1/2026 | Higgins .............. | G06N 3/0475 |

FOREIGN PATENT DOCUMENTS

| | | | | |
|---|---|---|---|---|
| CN | 118861698 A | * 10/2024 | ............. | G06Q 30/08 |

* cited by examiner

*Primary Examiner* — Md I Uddin
(74) *Attorney, Agent, or Firm* — HAUPTMAN HAM, LLP

(57) ABSTRACT

A system includes at least one processor, and at least one memory coupled to the at least one processor and configured to store executable instructions executable by the at least one processor to cause the at least one processor to perform operations. The operations include extracting text from a document, vectorizing the extracted text to obtain at least one vector, extracting image data from the document, storing, in an object storage, at least one image in the image data, and storing, in a vector database, the at least one vector with a link to the stored at least one image in the object storage.

15 Claims, 10 Drawing Sheets

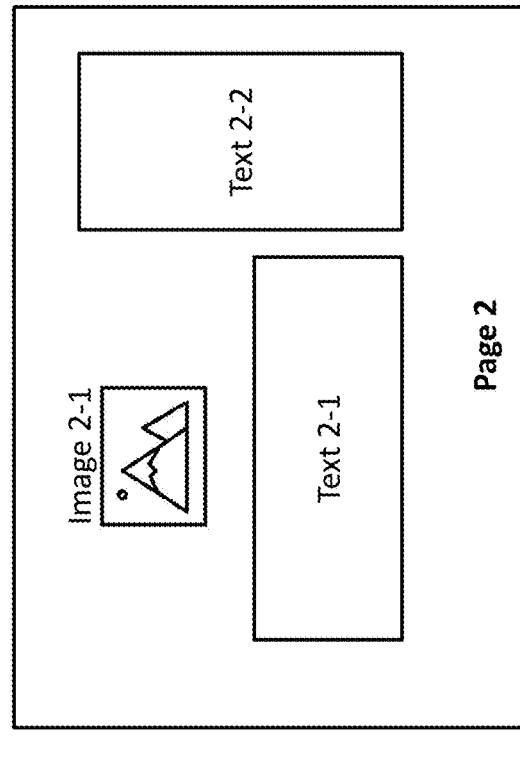
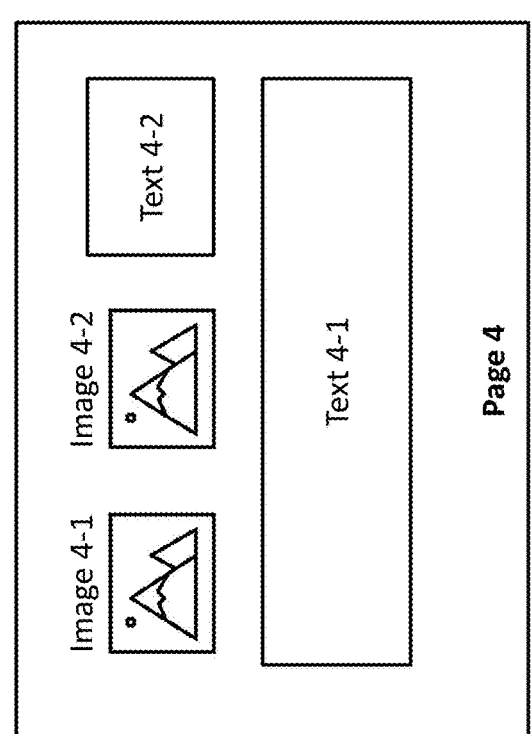
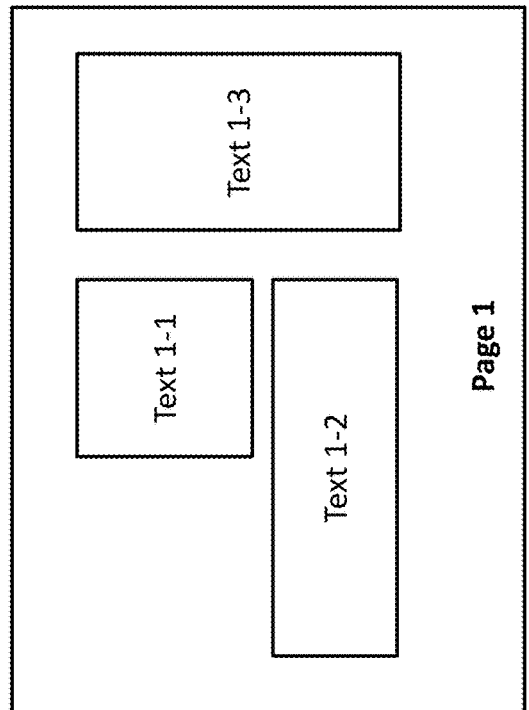
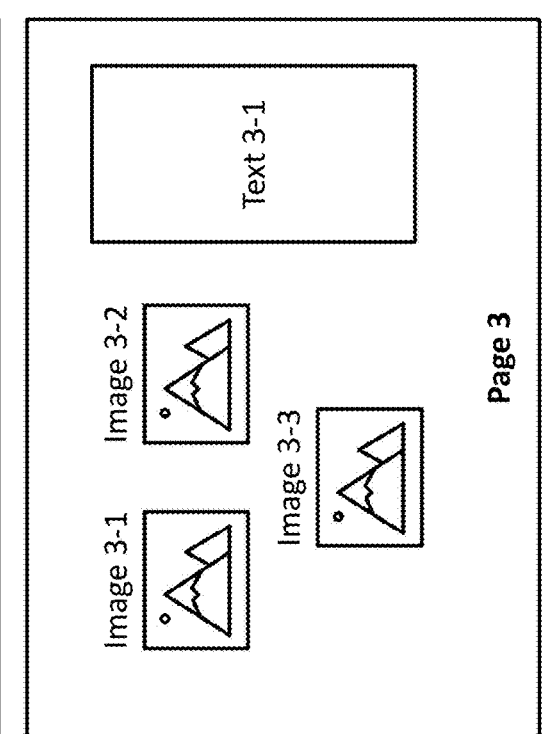
115
FIG. 2

500

Start

Retrieve Vector Metadata — 505

Retrieve Chunk Location from Vector Metadata — 510

Obtain All Extracted Image Metadata — 515

Retrieve Image Location from Image Metadata — 520

Do Chunk and Image Locations Match ? — 525

No → End

Yes

Add Array of Image Link(s) to Vector Metadata — 530

Save in Vector Database — 535

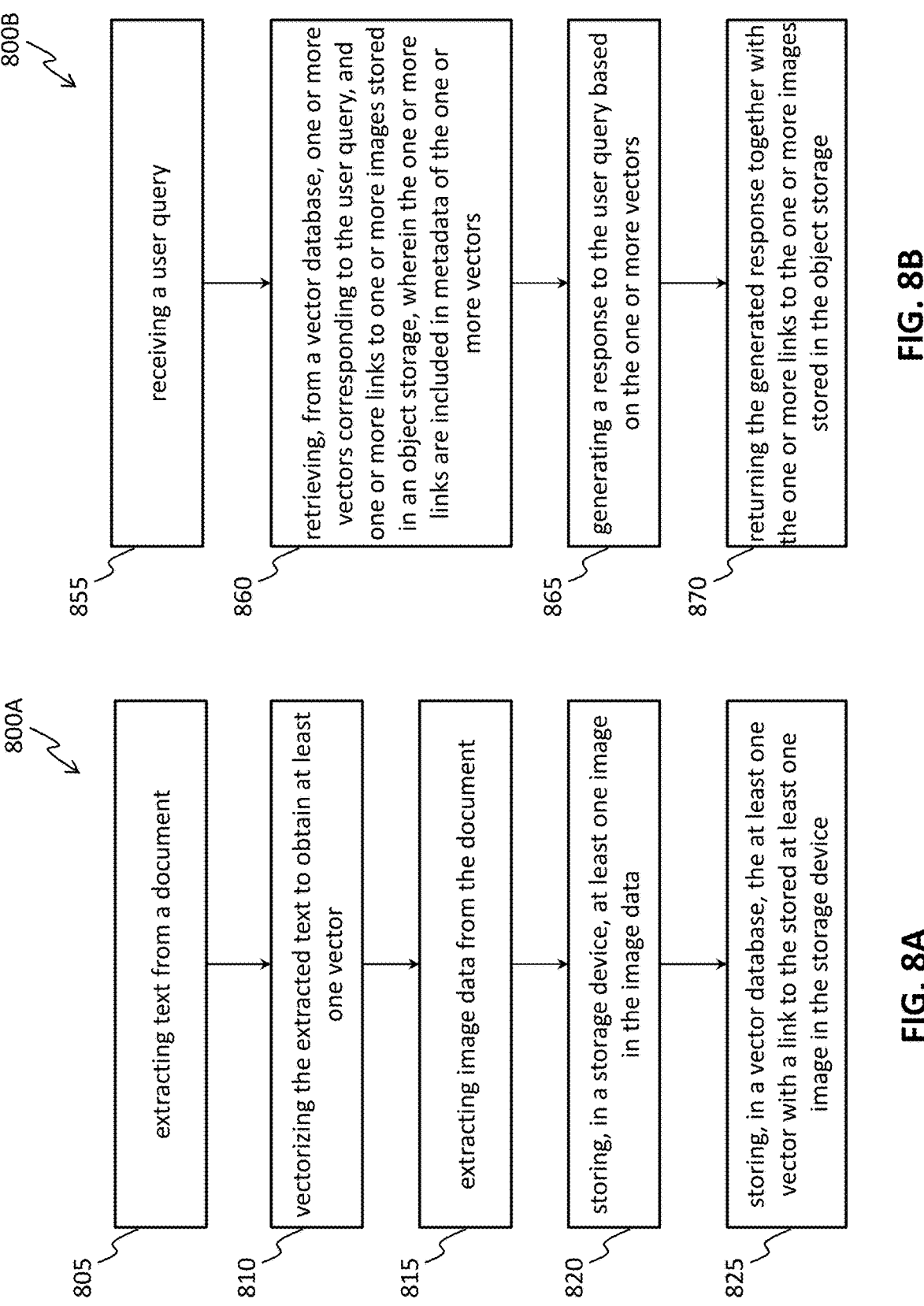

800B 855 receiving a user query 860 retrieving, from a vector database, one or more vectors corresponding to the user query, and one or more links to one or more images stored in an object storage, wherein the one or more links are included in metadata of the one or more vectors 865 generating a response to the user query based on the one or more vectors 870 returning the generated response together with the one or more links to the one or more images stored in the object storage

FIG. 8B

800A 805 extracting text from a document 810 vectorizing the extracted text to obtain at least one vector 815 extracting image data from the document 820 storing, in a storage device, at least one image in the image data 825 storing, in a vector database, the at least one vector with a link to the stored at least one image in the storage device

FIG. 8A

PROVIDING IMAGE CONTEXT FOR INFORMATION RETRIEVAL

BACKGROUND

Technical Field

The present disclosure relates to providing image context for information retrieval.

Background Art

An Artificial Intelligence (AI) system, such as a Large Language Model (LLM) is trained on a large amount of information to be able to provide human-like answers to questions and/or queries. Some approaches, such as Retrieval Augmented Generation (RAG), are proposed to provide context to an LLM to direct the LLM to provide answers in a specific field or for a specific purpose. Generally, answers provided by an LLM, with or without RAG, are text-based.

SUMMARY

In some embodiments, a system comprises at least one processor, and at least one memory coupled to the at least one processor. The at least one memory is configured to store executable instructions executable by the at least one processor to cause the at least one processor to perform operations. The operations comprise extracting text from a document, vectorizing the extracted text to obtain at least one vector, extracting image data from the document, storing, in an object storage, at least one image in the image data, and storing, in a vector database, the at least one vector with a link to the stored at least one image in the object storage.

In some embodiments, a method comprises extracting text from a document, vectorizing the extracted text to obtain at least one vector, extracting image data from the document, storing, in an object storage, at least one image in the image data, and storing, in a vector database, the at least one vector with a link to the stored at least one image in the object storage.

In some embodiments, a non-transitory computer-readable medium has executable instructions recorded thereon. The executable instructions, in response to execution by at least one processor, cause performance of operations. The operations comprise extracting text from a document, vectorizing the extracted text to obtain at least one vector, extracting image data from the document, storing, in an object storage, at least one image in the image data, and storing, in a vector database, the at least one vector with a link to the stored at least one image in the object storage.

BRIEF DESCRIPTION OF THE DRAWINGS

Features, aspects, and advantages of embodiments of the disclosure will be described below with reference to the accompanying drawings, in which like reference numerals denote like elements, and wherein:

FIG. 2 is a schematic diagram of pages of an example document, in accordance with some embodiments.

FIG. 8A and FIG. 8B are flow charts of one or more processes, in accordance with some embodiments.

DETAILED DESCRIPTION

Figure 1A:
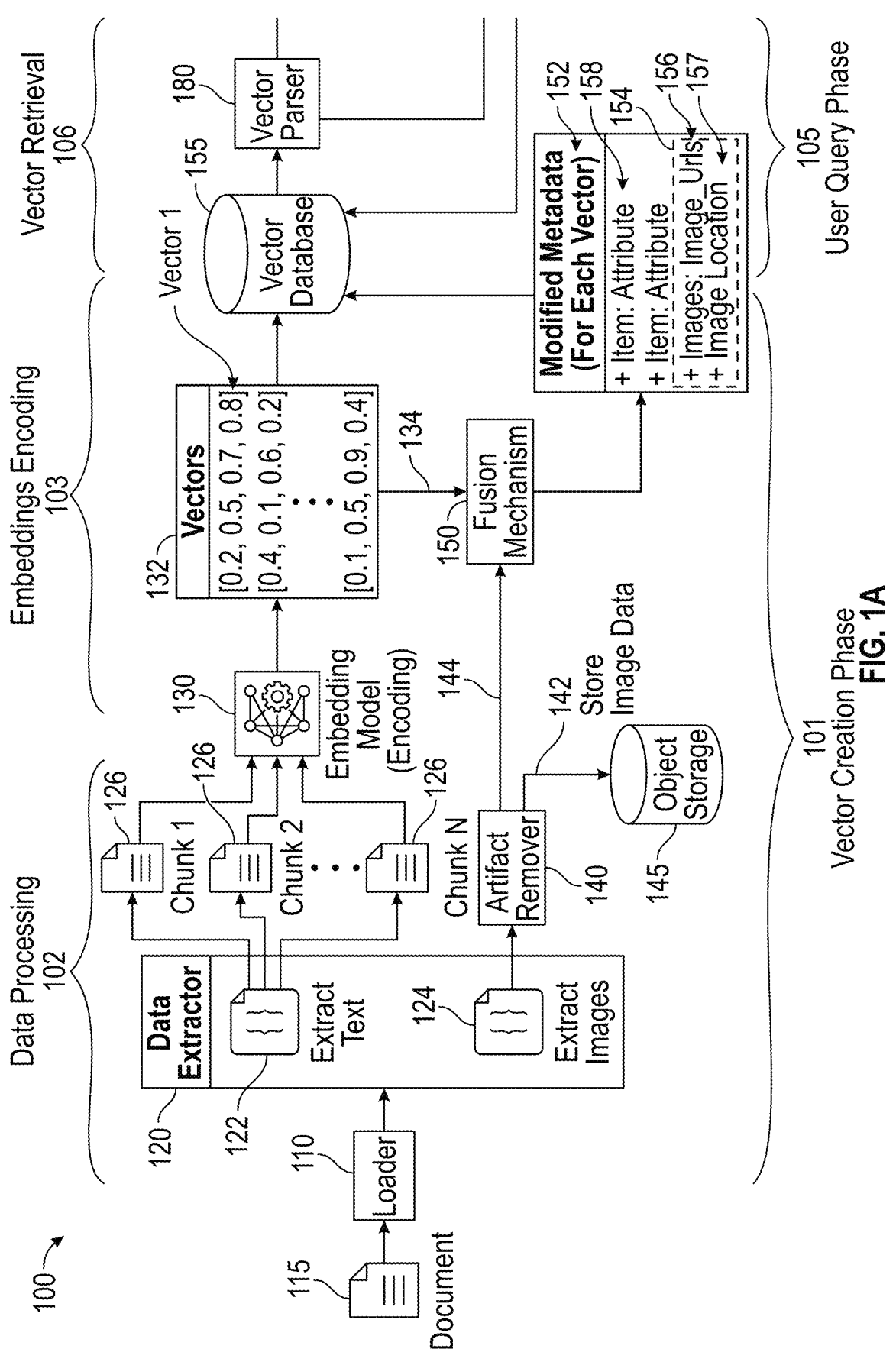
FIG. 1A and FIG. 1B are parts of a schematic diagram of a system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

It will be apparent that systems and/or methods, described herein, may be implemented in different forms of hardware, software, or a combination of hardware and software. The actual specialized control hardware or software code used to implement these systems and/or methods should not limit their implementations. Thus, the operation and behavior of the systems and/or methods are described herein without reference to specific software code. It is understood that software and hardware may be designed to implement the systems and/or methods based on the description herein.

Even though particular combinations of features are recited in the claims and/or disclosed in the specification, the particular combinations are not intended to limit the disclosure of implementations. In fact, many of these features may be combined in ways not specifically recited in the claims and/or disclosed in the specification. Even if a dependent claim directly depends on only one claim, the present disclosure may indicate that the dependent claim is dependent on other claims in the claim set.

No element, act, or instruction used herein should be construed as critical or essential unless explicitly described as such. Also, as used herein, the articles "a" and "an" (in other words, nouns not mentioned in the plural) are intended to include one or more items, and may be used interchangeably with "one or more." Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]," "[A] and/or [B]," or "at least one of [A] or [B]" are to be understood as including only A, only B, or both A and B.

As described herein, answers provided by an LLM, with or without RAG, are generally text-based. Current approaches lack the capability to effectively associate images with the relevant contextual information. A reason is that integrating text and image data is complex due to their different processing requirements and/or the lack of efficient storage systems for handling both data types simultaneously. Furthermore, current embedding models are primarily configured to for text, and it is not known how to effectively link images to text. Additionally, advanced data cleaning techniques required are not readily available in current systems. The above and/or other challenges are addressed, in one or more embodiments, by linking images to text through metadata.

In some embodiments, images are extracted from documents and stored separately in a storage device. In at least one embodiment, the extracted images are stored after artifact removal. Metadata linking the stored images to associated textual vectors are created, and stored with the associated vectors in a vector database. During retrieval, one or more vectors and links to their associated one or more images are fetched, allowing the system to include both text and images in a final response to a user query. Thus, unlike current approaches where answers provided by an LLM are limited to text-based data, it is possible in one or more embodiments to additionally provide image context for information retrieval by an LLM, e.g., an LLM with RAG. In at least one embodiment, the additionally provided image context significantly improves the contextual understanding and relevance of the retrieved information, offering a more robust and versatile solution.

Figure 1B:
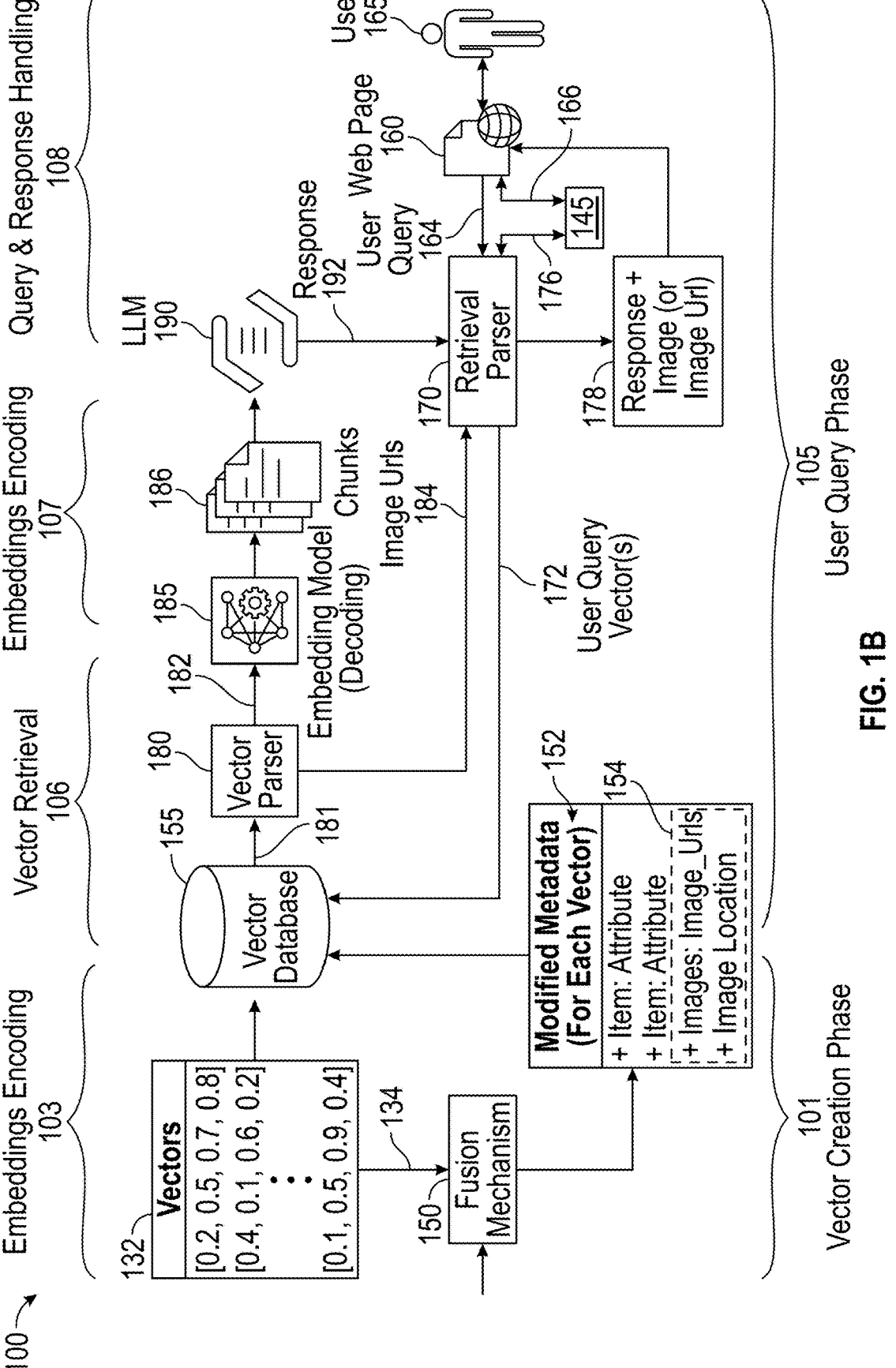

FIG. 1A and FIG. 1B are parts of a schematic diagram of a system 100 for providing image context for information retrieval, in accordance with some embodiments. In some embodiments, the system 100 is configured by one or more processors and/or one or more devices as described with respect to FIG. 9.

The system 100 comprises a plurality components including a document loader 110, a data extractor 120, an encoding embedding model 130, an artifact remover 140, an object storage 145, a fusion mechanism 150, a vector database 155, a user interface 160, a retrieval parser 170, a vector parser 180, a decoding embedding model 185, and an LLM 190. In some embodiments, the described components of the system 100 are implemented by one or more processors and/or devices as described with respect to FIG. 9, and/or are coupled with each other via one or more hardware buses and/or software buses and/or networks. In some embodiments, functions and/or operations described herein for each of the components of the system 100 are implemented by application-specific hardware and/or by hardware executing corresponding software or programs. In some embodiments, one or more of the described components are omitted, as described herein.

The system 100 is configured to perform a vector creation phase 101 and a user query phase 105.

The vector creation phase 101 is configured to generate information, including image context, to be retrieved by the user query phase 105 in response to a user query. The components of the system 100 involved in the vector creation phase 101 comprise the document loader 110, data extractor 120, encoding embedding model 130, artifact remover 140, object storage 145, fusion mechanism 150, and vector database 155. The vector creation phase 101 comprises a data processing operation 102 and an embeddings encoding operation 103. The data processing operation 102 is implemented by the document loader 110, data extractor 120, artifact remover 140, and object storage 145. The embeddings encoding operation 103 is implemented by the encoding embedding model 130, fusion mechanism 150, and vector database 155.

The user query phase 105 is configured to retrieve information relevant to a user query received from a user, and provide a final response including the retrieved information and corresponding image context to the user. The components of the system 100 involved in the user query phase 105 comprise the vector database 155, user interface 160, retrieval parser 170, vector parser 180, decoding embedding model 185, and LLM 190. The user query phase 105 comprises a vector retrieval operation 106, an embeddings decoding operation 107, and a query and response handling operation 108. The vector retrieval operation 106 is implemented by the vector database 155, and vector parser 180. The embeddings decoding operation 107 is implemented by the decoding embedding model 185. The query and response handling operation 108 is implemented by the user interface 160, retrieval parser 170, and LLM 190.

In at least one embodiment, the system 100 is configured to implement the vector creation phase 101, and the components involved in the user query phase 105 (except for the vector database 155) are omitted. In some embodiments, the system 100 is configured to implement the user query phase 105, and the components involved in the vector creation phase 101 (except for the vector database 155) are omitted. The vector creation phase 101 is described herein with respect to FIG. 1A. The user query phase 105 is described herein with respect to FIG. 1B.

In FIG. 1A, the vector creation phase 101 starts with the document loader 110 which is configured to provide a document 115 to be processed to the data extractor 120. In some embodiments, the document loader 110 is configured to perform pre-processing on the document 115, and then provide the pre-processed document 115 to the data extractor 120. For example, when the document 115 is an email, the document loader 110 converts the document 115 to a PDF file or an html (Hypertext Markup Language) file. Other file formats are within the scopes of various embodiments. In some embodiments, the document loader 110 is omitted.

The data extractor 120 is configured to extract text 122 and one or more images 124 from the document 115. The extracted text 122 is output as text chunks 126 to the encoding embedding model 130, whereas the extracted images 124 are output to the artifact remover 140. For simplicity, text chunks are referred to herein as chunks. The extracted images 124 are sometimes referred to as extracted image data or candidate images, which are to be further processed by the artifact remover 140 to obtain usable images that provide image context for the extracted text 122.

In some situations, the document 115 includes readily extractable text which is output as the extracted text 122, and one or more objects other than the extractable text which are treated as candidate images and output as the extracted images 124. For example, the document 115 is a file of a word processing program (such as Microsoft Word), a file of a spread sheet program (such as Microsoft Excel), a presentation program (such as Microsoft PowerPoint), an html file, a PDF file with readily extractable text, or the like.

In some situations, the document 115 (such as a PDF file in an image form) includes no readily extractable text, and the data extractor 120 performs an optical character recognition (OCR) operation to obtain the extracted text 122. One or more objects not recognizable by such OCR operation are treated as candidate images and output as the extracted images 124. In some embodiments, the described OCR operation is performed by the document loader 110.

In some situations, the document 115 includes no image, e.g., when the document 115 is a text file, and no extracted images 124 are output from the data extractor 120.

The data extractor 120 is further configured to splitting the extracted text 122 into a plurality of chunks 126, designated as Chunk 1, Chunk 2, . . . Chunk N, in FIG. 1A.

This process is sometimes referred to as "text chunking" which employs, in one or more embodiments, a chunking model to break down or split a large body of text into smaller pieces of a size manageable by software and/or AI models. For example, an essay is split into multiple paragraphs, and a paragraph is split into multiple sentences. In some embodiments, a chunk includes a sentence, several sentences, a hyper link, or the like. Sometimes an image or a video is included, as a hyper link, in a document, and the hyper link is treated as a text chunk by the data extractor 120. In at least one embodiment, a limit is applied to a total number of words or characters containable in a chunk. Other chunking approaches are within the scopes of various embodiments.

The data extractor 120 is further configured to provide metadata associated with each of the chunks 126 and the extracted images 124. In some embodiments, the metadata include a location of each of the chunks 126 and extracted images 124 in the document 115. In at least one embodiment, as described with respect to FIG. 2, the location corresponds to a page number of a page of the document 115 where the corresponding chunk or extracted image is contained. Other approaches for indicating a location of a chunk or an image in a document are within the scopes of various embodiments.

FIG. 2 is a schematic diagram of pages of an example of the document 115, in accordance with some embodiments. The document 115 includes a plurality of chunks corresponding to the chunks 126, and a plurality of images corresponding to the extracted images 124. In the example configuration in FIG. 2, the document 115 includes Page 1 to Page 4.

Page 1 contains chunks including Text 1-1, Text 1-2, Text 1-3. Page 1 contains no image. The chunk location of each of Text 1-1, Text 1-2, Text 1-3 is 1 or Page 1. No image context is associated with Text 1-1, Text 1-2, Text 1-3.

Page 2 contains chunks including Text 2-1, Text 2-2. Page 2 also contains an image, i.e., Image 2-1. The chunk location of each of Text 2-1, Text 2-2, and the image location of Image 2-1 are the same, i.e., 2 or Page 2. Text 2-1, Text 2-2 and Image 2-1 are on the same page of the document 115, and are considered related. In other words, Image 2-1 is considered to provide image context for each of Text 2-1, Text 2-2. Assuming that Image 2-1 passes an artifact removal at the artifact remover 140 and is stored in the object storage 145, Image 2-1 will be retrieved and included in a response when any of Text 2-1, Text 2-2 is retrieved in response to a user query, as described herein.

Page 3 contains a chunk, i.e., Text 3-1. Page 3 also contains images including Image 3-1, Image 3-2, Image 3-3. The chunk location of Text 3-1, and the image location of each o Image 3-1, Image 3-2, Image 3-3 are the same, i.e., 3 or Page 3. Text 3-1 and Image 3-1, Image 3-2, Image 3-3 on the same page of the document 115, and are considered related. In other words, Image 3-1, Image 3-2, Image 3-3 are considered to provide image context for Text 3-1. Assuming that Image 3-1, Image 3-2, Image 3-3 pass the artifact removal at the artifact remover 140 and are stored in the object storage 145, Image 3-1, Image 3-2, Image 3-3 will be retrieved and included in a response when Text 3-1 is retrieved in response to a user query, as described herein.

Page 4 contains chunks including Text 4-1, Text 4-2. Page 4 also contains images including Image 4-1, Image 4-2. The chunk location of each of Text 4-1, Text 4-2, and the image location of each of Image 4-1, Image 4-2 are the same, i.e., 4 or Page 4. Text 4-1, Text 4-2 and Image 4-1, Image 4-2 are on the same page of the document 115, and are considered related. In other words, Image 4-1, Image 4-2 are considered to provide image context for each of Text 4-1, Text 4 -2.Assuming that Image 4-1, Image 4-2 pass the artifact removal at the artifact remover 140 and are stored in the object storage 145, Image 4-1, Image 4-2 will be retrieved and included in a response when any of Text 4-1, Text 4-2 is retrieved in response to a user query, as described herein.

In some embodiments, the document 115 already includes discrete pages, and no paging or pagination is required. For example, when the document 115 is a file of a word processing program (such as Microsoft Word), a file of a spread sheet program (such as Microsoft Excel) with established page setup, a presentation program (such as Microsoft PowerPoint), a PDF file, or the like, page numbers or slide numbers (considered as page numbers herein) of the pages or slides in the document 115 are used as locations for the chunks and/or images contained in those pages or slides.

In some embodiments, the document 115 includes no discrete pages, and a paging or pagination operation is performed by the data extractor 120 to divide the document 115 into discrete pages and to provide corresponding page numbers. An example is when the document 115 is an html file. In some embodiments, the data extractor 120 divides the html file into pages based on a screen resolution for displaying the html file. For example, the html file is divided into pages based on a predetermined number of pixels, e.g., 500 pixels. In particular, a first 500-pixel-length section of the html file is considered a first page, a subsequent 500-pixel-length section of the html file is considered a second page, etc. Other approaches are within the scopes of various embodiments. For example, in one or more embodiments, documents with no discrete pages (e.g., html files, emails, or the like) are converted to PDF files at the document loader 110 so that the converted documents, when provided to the data extractor 120, already include discrete pages and page numbers.

Returning to FIG. 1A, the encoding embedding model 130 receives the chunks 126 from the data extractor 120, and is configured to convert, or encode, each of the chunks 126 into a corresponding vector to obtain vectors 132. For example, Vector 1, i.e., {0.2, 0.5, 0.7, 0.8}, in FIG. 1A is obtained when the encoding embedding model 130 encodes Chunk 1. Each of the vectors 132 encodes, or captures, the meaning of the corresponding chunk 126. In some embodiments, the encoding embedding model 130 includes, employs or is an AI model that has been already trained to perform the described vector embeddings. A process including text chunking described with respect to the data extractor 120 and vector embeddings described with respect to the encoding embedding model 130 is sometimes referred to as vectorizing or vectorization by which the extracted text 122 is vectorized to obtain at least one vector, such as the vectors 132.

The encoding embedding model 130 also receives metadata of the chunks 126 and is configured to include or associate the metadata of each chunk 126 with the corresponding vector 132. For example, a chunk location of Chunk 1 is included in the metadata of Chunk 1. The encoding embedding model 130 receives Chunk 1 and also the metadata thereof, including the chunk location of Chunk 1. The encoding embedding model 130 encodes Chunk 1 to obtain the corresponding vector, i.e., Vector 1. The encoding embedding model 130 also includes the chunk location of the Chunk 1 in metadata of Vector 1. As a result, Vector 1 and the metadata thereof capture not only the meaning of Chunk 1, but also the chunk location of the Chunk 1 in the document 115. In some embodiments, the encoding embedding model 130 provides the vectors 132 to the vector database 155 and metadata 134 of the vectors 132 to the fusion mechanism 150.

The artifact remover 140 receives, from the data extractor 120, the extracted images 124 as well as their corresponding image locations in the document 115. The artifact remover 140 is configured to perform artifact removal on the extracted images 124 to remove outliers. As described herein, the extracted images 124 include candidate images to be stored for later retrieval and inclusion in responses to user queries. However, not all candidate images are of sufficient sizes and/or quality to provide meaningful image context for responses to user queries. For example, candidate images that have unsupported formats, too small sizes, irregular shapes, insufficient levels of details, or low color intensities, are considered outliers and are discarded by the artifact remover 140. An example artifact removal performed by the artifact remover 140 is described in detail with respect to FIG. 4.

Among the extracted images 124, those candidate images that have passed the artifact removal of the artifact remover 140 are considered to have sufficient sizes and quality, and are stored, as indicated at 142, in the object storage 145. In some embodiments, the object storage 145 comprises one or more storage components as described with respect to FIG. 9. A link to each stored image in the object storage 145 is provided to the artifact remover 140 to enable later retrieval of the stored image from the object storage 145. In the example configuration in FIGS. 1A, 1B, each link is a URL (Uniform Resource Locator). Other link formats are within the scopes of various embodiments. For simplicity, a link to a stored image in the object storage 145 is referred to herein as an "image link." For each image that has passed the artifact removal and that has been stored in the object storage 145, the artifact remover 140 provides corresponding image information 144 to the fusion mechanism 150. The image information 144 is sometimes referred to as image metadata. In some embodiments, the image information 144 includes, for each stored image in the object storage 145, the image link as received from the object storage 145, and the corresponding image location as received from the data extractor 120. In at least one embodiment, the image information 144 includes a plurality of arrays each of which includes an image location and a list of one or more image links, as described herein.

The fusion mechanism 150 receives the metadata 134 of the vectors 132 from the encoding embedding model 130, and the image information 144 of the stored images in the object storage 145 from the artifact remover 140. The fusion mechanism 150 is configured to match the metadata 134 of each vector 132 with any stored image in the object storage 145, using the chunk location in the metadata 134 and the image locations in the image information 144. When a match is found, i.e., when the chunk location the vector 132 is the same as the image location in the document 115 of a stored image, the corresponding image link is added to the metadata of the vector 132. When multiple matches are found, i.e., when the chunk location the vector 132 is the same as the image location in the document 115 of multiple stored images, multiple corresponding image links are added to the metadata of the vector 132. The image link or image links is/are added to the metadata of the vector 132 in the form of an array 154. In the example configuration in FIGS. 1A, 1B, the array 154 includes a list of one or more image links 156 to one or more stored images contained on the same page as the chunk 126 represented by the vector 132.

The array 154 further includes the image location 157 of the stored images in the document 115.

The fusion mechanism 150 modifies the metadata of each vector 132, by adding thereto the array 154, to obtain modified metadata 152. In some embodiments, the image location 157 is omitted from the array 154 added to the metadata 134, because the image location 157 is the same as the chunk location already included in the metadata 134 as provided from the encoding embedding model 130. In the example configuration in FIGS. 1A, 1B, the modified metadata 152 for each vector 132 also include one or more attributes 158. The attributes 158 are included in the metadata 134 of the vector 132 and indicate one or more properties of the vector 132. For example, one of the attributes 158 indicates a filename of the document 115 from which the chunk corresponding to the vector 132 is extracted. A further one of the attributes 158 indicates the chunk location. Other attributes are within the scopes of various embodiments. In some embodiments, the modified metadata 152 of each vector 132 differs from the metadata 134 of the same vector 132 only by the array 154 (or by just the list of one or more image links 156) added by the fusion mechanism 150. The fusion mechanism 150 provides the modified metadata 152 to the vector database 155 where the modified metadata 152 is stored in association with the corresponding vector 132. In at least one embodiment, the object storage 145 and vector database 155 reside in the same device as described with respect to FIG. 9. In some embodiments, the object storage 145 and the vector database 155 reside in different devices.

Non-limiting examples are now described with respect to FIG. 2. The fusion mechanism 150 receives the metadata 134 of all vectors 132 corresponding to all chunks in the document 115, and the image information 144 of all images in the document 115 that are stored in the object storage 145. For simplicity, it is assumed in the following descriptions that all images in the example of the document 115 in FIG. 2 have passed the artifact removal and have been stored in the object storage 145. The fusion mechanism 150 is configured to find matches between the metadata 134 of all vectors 132 corresponding to all chunks Text 1-1, Text 1-2, Text 1-3, Text 2-1, Text 2-2, Text 3-1, Text 4-1, Text 4-2 in the document 115 and the image information 144 of all images Image 2-1, Image 3-1, Image 3-2, Image 3-3, Image 4-1, Image 4-2.

For each of Text 1-1, Text 1-2, Text 1-3 all having the chunk location of Page 1 in the metadata 134 of the corresponding vectors 132, there is no stored image having the matching image location of Page 1 in the corresponding image information 144. The fusion mechanism 150 does not modify the metadata 134 of the vectors 132 corresponding to Text 1-1, Text 1-2, Text 1-3. In other words, the modified metadata 152 of the vectors 132 corresponding to Text 1-1, Text 1-2, Text 1-3 are the same as the corresponding metadata 134.

For each of Text 2-1, Text 2-2 all having the chunk location of Page 2 in the metadata 134 of the corresponding vectors 132, there is one stored image, i.e., Image 2-1, having the matching image location of Page 2 in the corresponding image information 144. The fusion mechanism 150 modifies the metadata 134 of the vectors 132 corresponding to Text 2-1, Text 2-2 in the same way, i.e., to add the same array 154 including the image link to the stored Image 2-1.

For Text 3-1 having the chunk location of Page 3 in the metadata 134 of the corresponding vector 132, there are three stored images, i.e., Image 3-1, Image 3-2, Image 3-3, having the matching image location of Page 3 in the corresponding image information 144. The fusion mechanism 150 modifies the metadata 134 of the vector 132 corresponding to Text 3-1 by adding an array 154 including three image links to the stored Image 3-1, Image 3-2, Image 3-3.

For each of Text 4-1, Text 4-2 all having the chunk location of Page 4 in the metadata 134 of the corresponding vectors 132, there are two stored images, i.e., Image 4-1, Image 4-2, having the matching image location of Page 4 in the corresponding image information 144. The fusion mechanism 150 modifies the metadata 134 of the vectors 132 corresponding to Text 4-1, Text 4-2 in the same way, i.e., to add the same array 154 including two image links to the stored Image 4-1, Image 4-2.

When all matches have been found and the modified metadata 152 of all vectors 132 have been stored in the vector database 155 in association with the corresponding vectors 132, the processing of the current document 115 in the vector creation phase 101 is considered completed, and the system 100 proceeds to process a next document 115.

As the quantity of documents 115 processed by the system 100 increases, the amount of data, i.e., the number of stored images in the object storage 145 and the number of vectors 132 and corresponding modified metadata 152 in the vector database 155, also increases. The system 100 in general, and the object storage 145 and the vector database 155 in particular, are now ready for the user query phase 105.

The described configuration of the vector creation phase 101 is an example, and various modifications are within the scopes of various embodiments. For example, in one or more embodiments, the encoding embedding model 130 provides each vector 132 and the corresponding metadata 134 to the fusion mechanism 150. The fusion mechanism 150 modifies the metadata 134 of the vector 132 to include an array 154 of one or more image links. The fusion mechanism 150 then provides the vector 132 and the modified metadata 152 of the vector 132 to the vector database 155 to be recorded therein. In other words, a direct connection between the encoding embedding model 130 and the vector database 155 is omitted.

In at least one embodiment, in the vector creation phase 101, the system 100 provides an image-context aware arrangement that seamlessly integrates relevant images (through image links) with vectors corresponding to text chunks in a document. As a result, it is possible in one or more embodiments to ensure that stored images are accurately associated with their appropriate contextual information and, when the stored images are included in a response to a user query, the included images provide useful image context for the retrieved information in such response.

In FIG. 1B, the user query phase 105 starts with the user interface 160 receiving a user query from a user 165. In the example configuration in FIG. 1B, the user interface 160 comprises a web browser or a web page implemented by a device as described with respect to FIG. 9. The web browser or web page is configured to receive the user query, e.g., in the form of a chat prompt to an AI model or system. Other user interface configurations and/or user query formats are within the scopes of various embodiments. For simplicity, the user interface 160 is described in non-limiting examples herein as a web page. The user interface 160 provides the user query, designated as 164, to the retrieval parser 170.

The retrieval parser 170 is configured to parse, or vectorize, the user query 164 received from the user interface 160 to obtain at least one user query vector 172. In at least one embodiment, the vectorization of the user query 164 is similar to the vectorization of one or more chunks 126. In some situations, the user query 164 is simple or short, and is considered to include one chunk. The retrieval parser 170 then outputs one corresponding user query vector 172. In other situations, the user query 164 is more complex or longer, and is split into several chunks. The retrieval parser 170 then outputs several corresponding user query vectors 172. For simplicity, it is assumed that one user query vector 172 is output by the retrieval parser 170. The output user query vector 172 is provided to the vector database 155.

A search algorithm is executed at the vector database 155 to search for one or more vectors 132 which match, or are related to, the user query vector 172. In some embodiments, the search algorithm is included in the vector database 155, or in a computer system (e.g., a device as described with respect to FIG. 9) that hosts the vector database 155. In at least one embodiment, the search algorithm is executed by the retrieval parser 170, or by an entity or computer system (e.g., a device as described with respect to FIG. 9) not shown in FIG. 1B. Various search algorithms in current technology are usable. For example, the search algorithm searches for one or more vectors 132 which are closest to the user query vector 172, or have distances to the user query vector 172 within a predetermined range. Such one or more vectors 132 are considered matching or related to the user query vector 172, and are, for simplicity, referred to herein as matching vectors. A search result 181, which includes the matching vectors and their corresponding modified metadata 152, is output from the vector database 155 to the vector parser 180.

The vector parser 180 is configured to extract any image link(s) included in the modified metadata 152 of the matching vectors, and provides the extracted image link(s), designated as 184, to the retrieval parser 170. The vector parser 180 further provides the matching vectors, designated as 182, to the decoding embedding model 185. It should be noted that each matching vector 182 is actually a vector 132 stored in the vector database 155.

The retrieval parser 170 receives the image link(s) 184, and is configured to remove any duplicated links from the image link(s) 184. For example, with reference to FIG. 2, when the matching vectors 182 corresponding to chunks Text 2-1 and Text 2-2 are included in the search result 181, the image links 184 extracted by the vector parser 180 include the image link to Image 2-1 twice, i.e., one from in the modified metadata 152 of the matching vector 182 corresponding to Text 2-1, and the other from in the modified metadata 152 of the matching vector 182 corresponding to Text 2-2. The retrieval parser 170 recognizes this duplication, and removes one of the duplicated image links from the image link(s) 184. The remaining image link is subsequently included in a combined response 178 output by the retrieval parser 170, as described herein.

In some embodiments, the retrieval parser 170 and vector parser 180 are configured as a single module referred to as the parser. In one or more embodiments, the parser is configured to perform one or more operations described with respect to the retrieval parser 170 and vector parser 180, i.e., vectorizing the user query 164 to obtain the user query vector 172, executing the search algorithm in the vector database 155 with respect to the user query vector 172, extracting the image link(s) 184 (if any) from the search result 181, removing any duplicated image link from the image link(s) 184, providing the matching vectors 182 to the decoding embedding model 185, receiving a response 192 from the LLM 190, and generating a combined response 178, as described herein.

The decoding embedding model 185 receives the matching vectors 182, and is configured to perform an operation opposite to that of the encoding embedding model 130, i.e., the decoding embedding model 185 is configured to decode the matching vectors 182 to obtain corresponding chunks 186. In at least one embodiment, at least one of the chunks 186 is the same, or has the same meaning, as the chunk 126 which was encoded to obtain the corresponding matching vector 182. The chunks 186 are provided from the decoding embedding model 185 to the LLM 190.

The LLM 190 receives the chunks 186, e.g., as one or more chat prompts, in one or more embodiments. The LLM 190 is configured to, based on the chunks 186 and its training, provide a response 192 to the user query 164. In at least one embodiment, the response 192 is a human-like response.

In some embodiments, the LLM 190 is a self-hosted LLM included in the system 100. In at least one embodiment, the LLM 190 is a general purpose LLM, which is hosted and/or trained by a third party outside the system 100 and is not included in the system 100. In either case, by providing the chunks 186 to the LLM 190, the LLM 190 is provided with knowledge (e.g., one or more chunks 126 corresponding to the chunks 186 and included in one or more documents 115) specifically related to the user query 164 where such knowledge might not be included in the training of the LLM 190. As a result, the LLM 190 is enabled to formulate the response 192 directed to and based on the knowledge specifically relevant to the user query 164, without the need to retrain the LLM 190.

The described arrangement of the system 100 which, in response to a user query, performs a search in a vector database, and then provides matching vectors returned from the search to an LLM for formulating a response is an example of RAG. Compared to other approaches where responses from an LLM, with or without RAG, are generally limited to text only, the RAG implementation in accordance with some embodiments is further configured to provide image context for responses from an LLM.

Specifically, the response 192 is provided from the LLM 190 to the retrieval parser 170. The retrieval parser 170 outputs a combined response 178 including the response 192 and the image link(s) 184 (after removal of duplicated image links). The combined response 178 is provided to the user interface 160. The user interface 160, based on the image link(s) 184 included in the combined response 178, accesses the object storage 145, as indicated at 166, and retrieves the corresponding stored image(s) therefrom. The user interface 160 then outputs, e.g., displays, to the user 165 a final response including the response 192 and the retrieved image (s).

In an alternative configuration in accordance with some embodiments, the retrieval parser 170 itself retrieves, as indicated at 176, the corresponding stored image(s) from the object storage 145, and includes the retrieved image(s), instead of the image link(s) 184 (after removal of duplicated image links), in the combined response 178. The user interface 160 then outputs, e.g., displays, to the user 165 the final response including the response 192 and the retrieved image(s).

In either of the described alternative configurations, the final response provided to the user 165 in response to the user query 164 includes both the response 192 and the retrieved image(s). The retrieved image(s) is/are related to the text chunks corresponding to the matching vectors 182 based on which the response 192 is generated, because the retrieved image(s) and the text chunks are included at the same location (e.g., on the same page of the same document 115). As a result, the retrieved image(s) included in the final response is relevant to the response 192, also included in the final response, and provide(s) image context for the response 192. In some embodiments, where the response 192 is formulated based on matching vectors 182 corresponding to text chunks from different documents, or from different pages of the same document, the retrieved images included in the final response also come from the different documents, or from the different pages of the same document, and provide relevant and/or accurate image context for the response 192.

In some embodiments, the system 100 extends the capabilities of RAG to include image data. This results in an image-context aware arrangement or framework that seamlessly integrates relevant images with RAG vectors, ensuring that images are accurately associated with their appropriate contextual information. In at least one embodiment, the described framework or arrangement expands functionality by providing context for text and images, whereas the other approaches only provide text context. This enhancement simplifies processes, improving the relevance of information retrieval, and broadens the potential applications of the technology, thereby providing a more comprehensive and efficient solution. In at least one embodiment, the system 100 enhances RAG by incorporating image data into the retrieval process. By integrating images into the RAG process, the system 100 significantly improves, in one or more embodiments, the contextual understanding and relevance of the retrieved information, offering a more robust and versatile solution.

Figure 3:
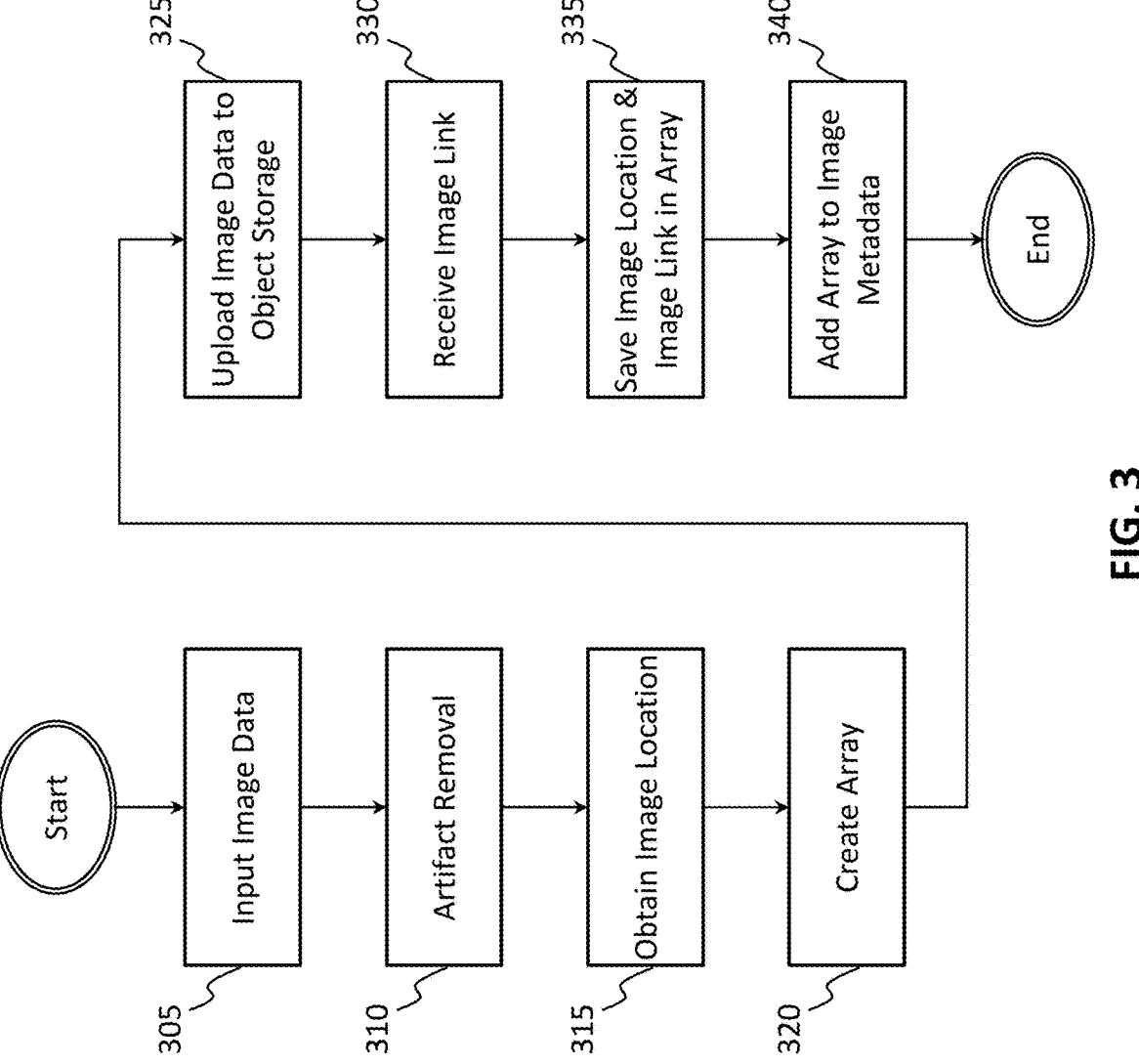
FIG. 3 is a flow chart of a process for image processing, in accordance with some embodiments.

FIG. 3 is a flow chart of a process 300 for image processing, in accordance with some embodiments. In some embodiments, the process 300 corresponds to a portion of the vector creation phase 101, and/or involves operations of the artifact remover 140 and/or the object storage 145.

At operation 305, image data are input. For example, the image data include the extracted images 124 and are input into the artifact remover 140.

At operation 310, an artifact removal operation is performed. As described herein, the extracted images 124 include candidate images to be stored for later retrieval and inclusion in responses to user queries. However, not all candidate images are of sufficient sizes and/or quality to provide meaningful image context for responses to user queries. Therefore, an artifact removal operation is performed at the artifact remover 140 to identify and discard outliers, without storing such outliers into the object storage 145. An example artifact removal operation is described in detail with respect to FIG. 4.

At operation 315, the image location of each extracted image 124 that has passed the artifact removal is obtained, e.g., from the metadata of the extracted image 124. In an example, the image location of each extracted image 124 includes the page number of the page where the extracted image 124 was extracted from.

At operation 320, an array is created or initialized. In some embodiments, the created array is initially empty. Information such as the image location and one or more image links will be later added to the array, e.g., at operation 335.

At operation 325, image data are uploaded to an object storage. For example, image data of each extracted image 124 that has passed the artifact removal are uploaded to the object storage 145 to be stored therein.

At operation 330, an image link is received. For example, when an extracted image 124 is stored in the object storage 145, an image link to the stored image is returned. In at least one embodiment, the image link is an URL.

At operation 335, the image location obtained at operation 315 and the image link obtained at operation 330 are saved or added to the array created or initialized at operation 320. When multiple stored images have the same image location, e.g., they were all extracted from the same page, the corresponding multiple image links to the multiple stored images are all added to the same array.

For example, with reference to FIG. 2, a first array including the image location of Page 1 is either empty, or not created. A second array including the image location of Page 2 also includes one image link to stored Image 2-1. A third array including the image location of Page 3 also includes three image links to three stored Image 3-1, Image 3-2, Image 3-3. A fourth array including the image location of Page 4 also includes two image links to two stored Image 4-1, Image 4-2.

At operation 340, the array is added to image metadata. For example, each array including an image location and a list of one or more image links obtained at operation 335 is added to image metadata, e.g., the image information 144, to be provided from the artifact remover 140 to the fusion mechanism 150.

In some embodiments, operations 305, 310 are performed for each extracted image 124 provided from the data extractor 120. Operations 315, 325, 330, 335 are performed for each extracted image 124 that has passed the artifact removal. Operation 320 is performed once for each array or each image location (each page in the document 115). Operation 340 is performed once at the end of the process 300 when all extracted images 124 provided from the data extractor 120 have been processed.

In some embodiments, the process 300 provides an effective arrangement in which the extracted images, after being processed for outlier removal, are stored for later retrieval and corresponding image links are grouped by image locations into arrays for efficient metadata transmission and/or handling at a later stage.

Figure 4:
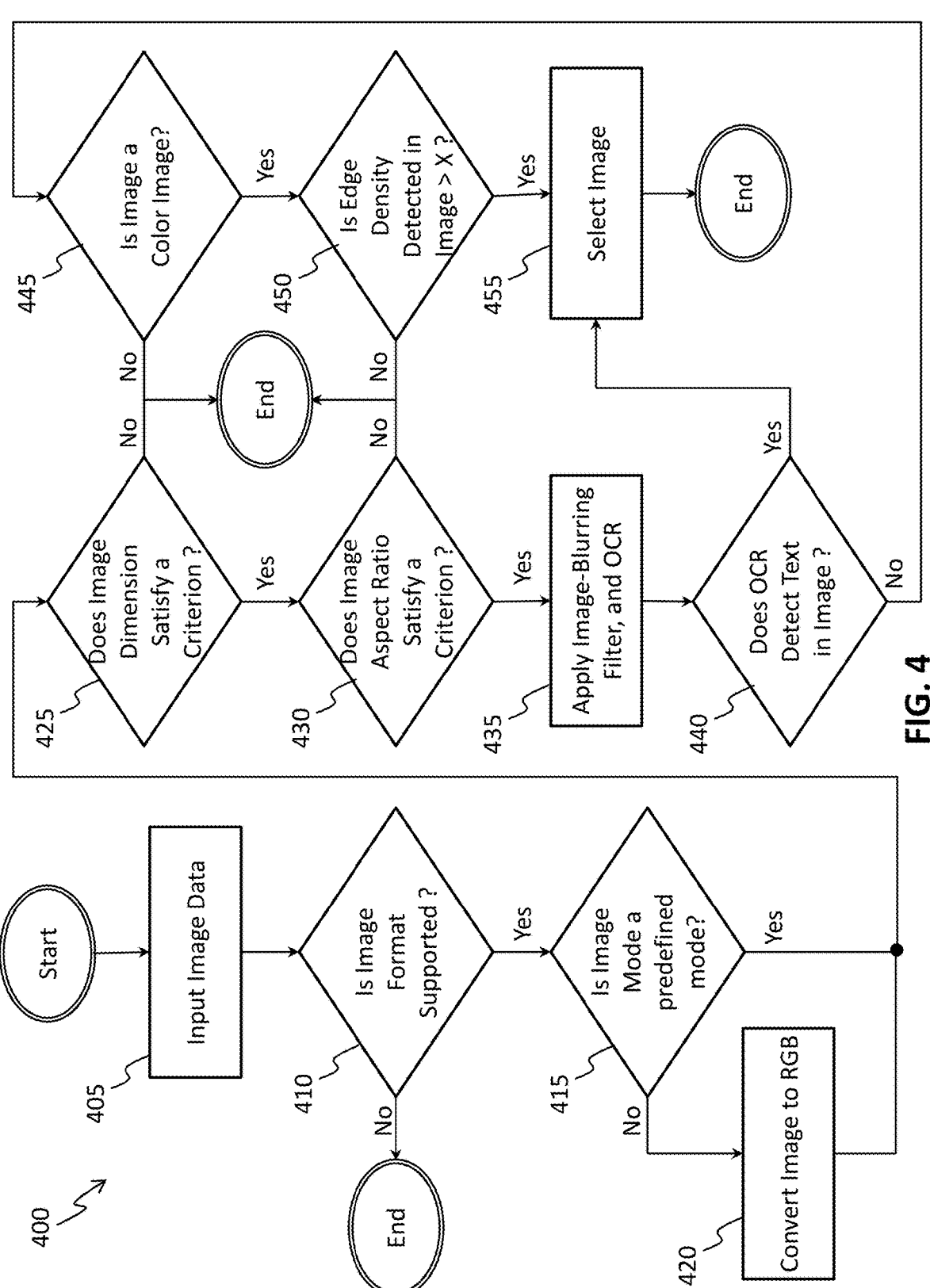
FIG. 4 is a flow chart of a process for artifact removal, in accordance with some embodiments.

FIG. 4 is a flow chart of a process 400 for artifact removal, in accordance with some embodiments. In some embodiments, the process 400 is performed at the artifact remover 140. The operations in the process 400 are performed for one of the extracted images 124, e.g., for one candidate image, at a time.

At operation 405, image data are input. For example, the image data of one candidate image are input into the artifact remover 140.

At operation 410, it is determined whether an image format of the candidate image is supported, e.g., it is determined whether the image format of the candidate image satisfies a predetermined criterion. Examples of supported image formats include, but are not limited to, PNG, JPEG, or the like. Other supported image formats are within the scopes of various embodiments. In response to determining that the image format of the candidate image is supported (Yes from operation 410), the process proceeds to operation 415. In response to determining that the image format of the candidate image is not supported (No from operation 410), the process is ended for the current candidate image, and a next candidate image is input at operation 405. In at least one embodiment, a purpose of operation 410 is to ensure that the image to be stored and retrieved later has an image format supported by various other components of the system.

At operation 415, it is determined whether an image mode of the candidate image is a predetermined image mode. In some embodiments, the predetermined image mode is RGB (red-green-blue). Other image modes are within the scopes of various embodiments. In response to determining that the image mode of the candidate image is the predetermined image mode (Yes from operation 415), the process proceeds to operation 425. In response to determining that the image mode of the candidate image is different from the predetermined image (No from operation 415), the process proceeds to operation 420.

At operation 420, the candidate image is converted to the predetermined image mode, e.g., RGB. The process then proceeds to operation 425. In at least one embodiment, a purpose of operations 415, 420 is to ensure that the candidate image has the image mode suitable for one or more subsequent operations in the process 400.

At operation 425, it is determined whether an image dimension of the candidate image satisfies a predetermined criterion, e.g., whether the image dimension is greater than or equal to a predetermined minimum dimension. In some embodiments, the minimum dimension is 100 pixels (in height) by 100 pixels (in width). Other minimum dimensions are within the scopes of various embodiments. In response to determining that the image dimension of the candidate image is at least the minimum dimension (Yes from operation 425), the process proceeds to operation 430. In response to determining that the image dimension of the candidate image is smaller than the minimum dimension (No from operation 425), the process is ended for the current candidate image, and a next candidate image is input at operation 405. In at least one embodiment, a purpose of operation 425 is to ensure that the image to be stored is sufficiently large to provide meaningful image context when retrieved and included in a final response.

At operation 430, it is determined whether an image aspect ratio of the candidate image satisfies a predetermined criterion, e.g., whether the image aspect ratio is in a predetermined aspect ratio range. In some embodiments, the predetermined aspect ratio range is from 0.5 (inclusive) to 2.0 (inclusive). Other predetermined aspect ratio ranges are within the scopes of various embodiments. In response to determining that the image aspect ratio of the candidate image is within the predetermined aspect ratio range (Yes from operation 430), the process proceeds to operation 435. In response to determining that the image aspect ratio of the candidate image is outside the predetermined aspect ratio range (No from operation 430), the process is ended for the current candidate image, and a next candidate image is input at operation 405. In at least one embodiment, a purpose of operation 430 is to ensure that the image to be stored does not have an irregular shape, e.g., a too-thin and too-long shape, which may not be able provide meaningful image context when retrieved and included in a final response.

At operation 435, an image-blurring filter and an OCR operation are subsequently applied to the candidate image. In some embodiments, the image-blurring filter is a Gaussian blurring filter. Other filters within the scopes of various embodiments. In some embodiments, the image-blurring filter is omitted. In at least one embodiment, a purpose of the image-blurring filter is to assist the subsequent OCR operation.

At operation 440, it is determined whether the OCR operation detects text in the candidate image. In some embodiments, it is determined whether the OCR operation detects at least two characters in the candidate image. Other criteria for determining whether the OCR operation detects text in the candidate image are within the scopes of various embodiments. In response to determining that the OCR operation detects text in the candidate image (Yes from operation 440), the process proceeds to operation 455. In response to determining that the OCR operation detects no text in the candidate image (No from operation 440), the process proceeds to operation 445. In at least one embodiment, a purpose of operation 440 and the OCR operation is to check the quality of the candidate image, i.e., if text is detected by OCR in the candidate image, the candidate image has sufficient quality to be stored for later retrieval and inclusion in a final response.

At operation 445, it is determined whether the candidate image is a color image. In some embodiments, a color image does not necessarily include color other than black and white. A color image may be a gray scale image. In at least one embodiment, the candidate image is considered a color image when a mean saturation of the candidate image satisfies a predetermined criterion, e.g., when the mean saturation is more than 10. Other manners and/or mean saturation thresholds for determining whether the candidate image is a color image are within the scopes of various embodiments. In response to determining that the candidate image is a color image (Yes from operation 445), the process proceeds to operation 450. In response to determining that the candidate image is not a color image (No from operation 445), the process is ended for the current candidate image, and a next candidate image is input at operation 405. In at least one embodiment, a purpose of operation 445 is to ensure that the candidate image has sufficient quality to be stored for later retrieval and inclusion in a final response.

At operation 450, it is determined whether a density of edges (or edge density) detected in the candidate image satisfies a predetermined criterion, e.g., when the edge density is more than a value of X. In some embodiments, X is 0.01. Other values of X are within the scopes of various embodiments. For operation 450, an edge detection, which is an image processing/recognition technique, is performed to detect edges in the candidate image, and then the edge density is calculated. In response to determining that the edge density of the candidate image is greater than X (Yes from operation 450), the process proceeds to operation 455. In response to determining that the edge density of the candidate image is not greater than X (No from operation 450), the process is ended for the current candidate image, and a next candidate image is input at operation 405. In at least one embodiment, a purpose of operation 450 is to ensure that the candidate image has sufficient details (e.g., a sufficient edge density) to provide meaningful image context when retrieved and included in a final response.

At operation 455, the candidate image is selected to be stored in the object storage 145 for later retrieval and inclusion in a final response. The process is ended for the current candidate image, and a next candidate image is input at operation 405. The process 400 is performed until all extracted images 124 provided from the data extractor 120 have been processed.

In the process 400, No from any of operations 410, 425, 430, 445, 450 means that the current candidate image is discarded, without being stored in the object storage, in response to any of an image format, an image dimension, an image aspect ratio, mean saturation and a density of detected edges of the candidate image not satisfying a corresponding predetermined criterion. Further, Yes from all operations 410, 425, 430, 445, 450 means that the current candidate image is stored in the object storage, in response to all of the image format, the image dimension, the image aspect ratio, the mean saturation and the density of detected edges of the candidate image satisfying the corresponding predetermined criteria. Further, Yes from all operations 410, 425, 430, 440 means that the current candidate image is stored in the object storage, in response to the image format, the image dimension, the image aspect ratio satisfying the corresponding predetermined criteria and the OCR operation detecting text in the candidate image.

In some embodiments, the process 400 provides an effective arrangement for removing outliers, e.g., candidate images (extracted images 124) that have unsupported image formats, too small sizes, irregular shapes, insufficient quality or levels of details, or low color intensities. As a result, in one or more embodiments, only extracted images that may provide meaningful image context for later retrieval are stored, thereby saving storage space in the object storage 145 and also enhancing image context and/or relevancy of final responses provided to end users.

Figure 5:
FIG. 5 is a flow chart of a process at a fusion mechanism, in accordance with some embodiments.

FIG. 5 is a flow chart of a process 500 at a fusion mechanism, in accordance with some embodiments. In some embodiments, the process 500 is performed at the fusion mechanism 150.

At operation 505, vector metadata are retrieved. For example, the metadata 134 of the vectors 132 are received at the fusion mechanism 150.

At operation 510, one or more chunk locations are retrieved from the vector metadata. For example, the chunk locations in the document 115 of the chunks corresponding to the vectors 132 are retrieved from the metadata 134.

At operation 515, all extracted image metadata are retrieved. For example, the image metadata of all the extracted images 124, that have passed the artifact remover 140 and have been stored in the object storage 145, are included in the image information 144 and are received at the fusion mechanism 150.

At operation 520, one or more image locations are retrieved from image metadata. For example, the image location in the document 115 of each stored image is retrieved. For a further example, the image location in the document 115 of an array of multiple stored images on the same page of the document 115 is retrieved.

At operation 525, it is determined whether a chunk location retrieved at operation 510 matches an image location retrieved at operation 520. In some embodiments, operation 525 is performed for one vector 132 (e.g., one chunk) at a time. In response to the chunk location in the metadata of the current vector 132 matching an image location among the image locations of all stored images (Yes from operation 525), the process proceeds to operation 530. Otherwise (No from operation 525), the process is ended for the current vector 132, and a next vector 132 is processed at operation 525.

At operation 530, an array of image link(s) is added to vector metadata. For example, an array 154 including a list of one or more image links 156 having the same (i.e., matching) image location as the chunk location of the current vector 132 is added to the metadata of the vector 132 to obtain the modified metadata 152 of the vector 132. The process then proceeds to operation 535.

At operation 535, the modified metadata 152 of the vector 132 are saved in the vector database 155. The process is ended for the current vector 132, and a next vector 132 is processed at operation 525. The process 500 is performed until all vectors 132 (e.g., all chunks 126) have been processed at operation 525.

In some embodiments, the process 500 provides an effective arrangement for matching, or "fusing," chunks/vectors with relevant stored images which were extracted from the same location (e.g., the same page of the same document), and for modifying the vector metadata with image links to the relevant stored images. As a result, in one or more embodiments, when a chunk/vector is used for generating a response, it is possible to retrieve and include stored images relevant to the chunk in a final response, to provide relevant and useful image context.

Figure 6:
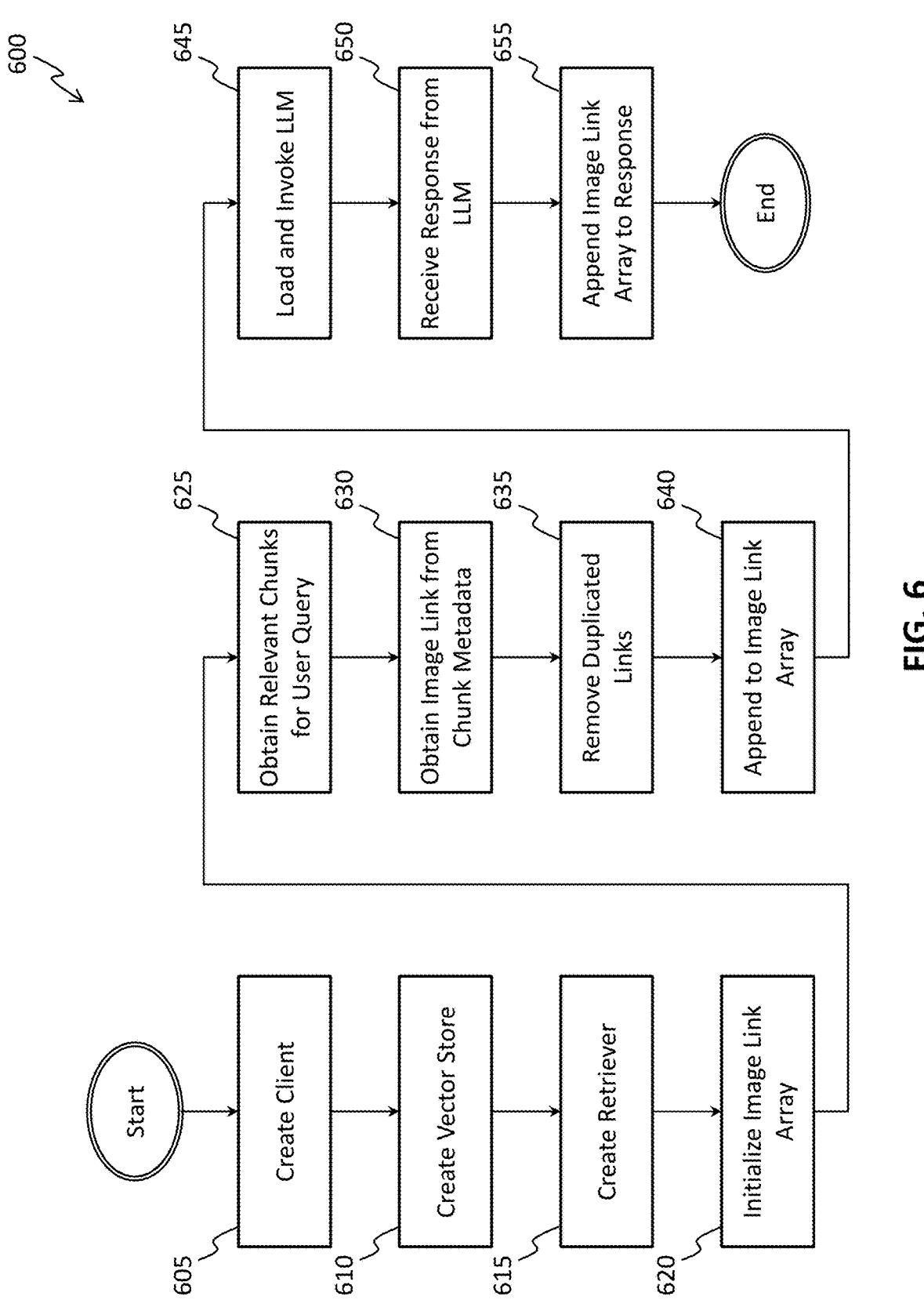
FIG. 6 is a flow chart of a process in a user query phase, in accordance with some embodiments.

FIG. 6 is a flow chart of a process 600 in a user query phase, in accordance with some embodiments. In some embodiments, the process 600 is performed at the user query phase 105.

At operation 605, a client is created.

At operation 610, a vector store is created.

At operation 615, a retriever is created. The client, vector store and retriever created or initialized at operations 605, 610, 615 are one or more software modules executed on hardware for handling a user query and/or interfacing with the vector database 155.

At operation 620, an image link array is initialized. Initially, the initialized image link array is empty.

At operation 625, relevant chunks corresponding to a user query are obtained. For example, a user query 164 is converted to at least one user query vector 172, a search is performed in the vector database 155 for the user query vector 172 and returns matching vectors 182 which are decoded by the decoding embedding model 185 to provide chunks 186 relevant to the user query 164.

At operation 630, at least one image link is obtained from chunk metadata. For example, image link(s) 184 is obtained from the metadata of the matching vectors 182. The metadata of the matching vectors 182 are the modified metadata 152 obtained and saved by the fusion mechanism 150 to the vector database 155. The metadata of the matching vectors 182 therefore include the metadata of the original chunks in the document 115 that were encoded into the matching vectors 182.

At operation 635, duplicated links among the image links obtained at operation 630 are removed, for example, as described with respect to FIGS. 1B and 2.

At operation 640, the image link(s) remaining after operation 635 is/are added to the image link array initialized at operation 620.

At operation 645, an LLM is loaded and invoked. For example, the chunks 186 corresponding to the matching vectors 182 are input to the LLM 190.

At operation 650, a response is received from the LLM. For example, the chunks 186 input to the LLM 190 prompt the LLM 190 to generate a response 192. In some embodiments, the response 192 is a human-like response and is text-based.

At operation 655, the image link array obtained at operation 640 is appended or added to the response 192 received at operation 650, to obtain a combined response 178. The process is ended when the combined response 178 is provided to the user interface 160 which retrieves one or more stored images from the object storage 145 based on the appended image links, and presents a final response including both a human-like response (e.g., the response 192) and image context (e.g., the retrieved images) to the user 165.

In some embodiments, the process 600 provides an enhanced final response, with both a human-like response and relevant image context, in response to a user query. This is a significant improvement, in one or more embodiments, over other approaches in which responses by an LLM to user queries are limited to text only.

Figure 7:
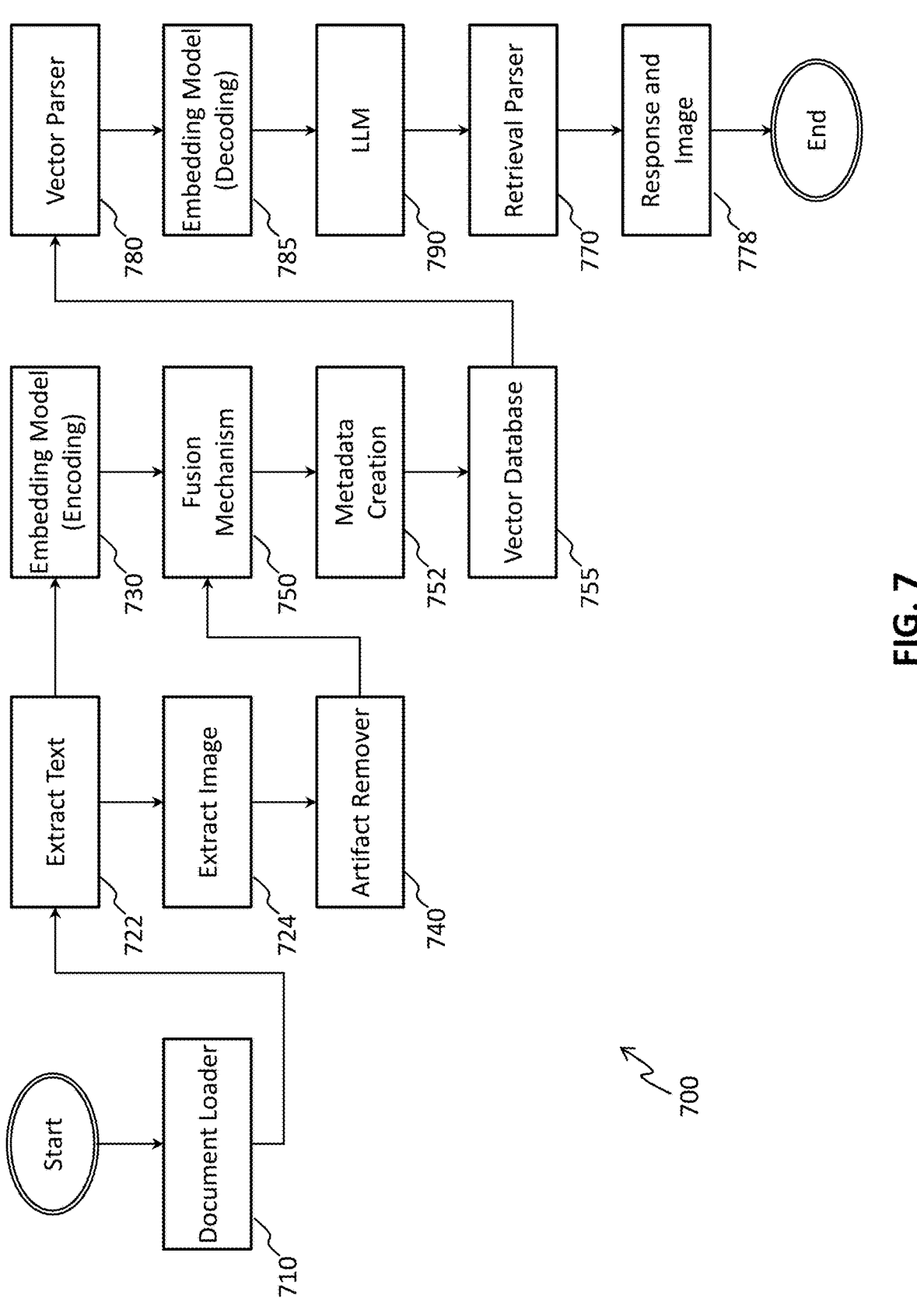
FIG. 7 is a flow chart of a process performed in a vector creation phase and in a user query phase, in accordance with some embodiments.

FIG. 7 is a flow chart of a process 700 performed in a vector creation phase and in a user query phase, in accordance with some embodiments. In some embodiments, the process 700 corresponds to the vector creation phase 101 and user query phase 105.

In the process 700, operations 710, 722, 724, 730, 740, 750, 752, 755, 780, 785, 790, 770 and 778 respectively correspond to one or more operations described with respect to the document loader 110, extracted text 122, extracted images 124, encoding embedding model 130, artifact remover 140, fusion mechanism 150, modified metadata 152, vector database 155, vector parser 180, decoding embedding model 185, LLM 190, retrieval parser 170, and combined response 178. In some embodiments, one or more advantages described herein with respect to at least the vector creation phase 101 and user query phase 105 are achievable by the process 700.

FIG. 8A is a flow chart of a process 800A, in accordance with some embodiments. In some embodiments, the process 800A corresponds to one or more operations in the vector creation phase 101.

Operation 805 comprises extracting text from a document. For example, extracted text 122 is extracted from a document 115.

Operation 810 comprises vectorizing the extracted text to obtain at least one vector. For example, the extracted text 122 is vectorized by a data extractor 120 and an encoding embedding model 130 to obtain vectors 132.

Operation 815 comprises extracting image data from the document. For example, image data comprise extracted images 124 extracted from the document 115.

Operation 820 comprises storing, in an object storage, at least one image in the image data. For example, candidate images in the extracted images 124 that have passed an artifact removal of an artifact remover 140 are stored in the object storage 145.

Operation 825 comprises storing, in a vector database, the at least one vector with a link to the stored at least one image in the object storage. For example, the vectors 132 are stored in the vector database 155 in association with corresponding modified metadata 152 which include one or more image links 156 to corresponding one or more stored images in the object storage 145.

In some embodiments, one or more advantages described herein with respect to the vector creation phase 101 are achievable by the process 800A.

FIG. 8B is a flow chart of a process 800B, in accordance with some embodiments. In some embodiments, the process 800B corresponds to one or more operations in the user query phase 105.

Operation 855 comprises receiving a user query. For example, a user query is received from a user 165 through a user interface 160.

Operation 860 comprises retrieving, from a vector database, one or more vectors corresponding to the user query, and one or more links to one or more images stored in an object storage, wherein the one or more links are included in metadata of the one or more vectors. For example, the user query 164 is converted to user query vector 172 based on which a search is performed in the vector database 155. As a search result, one or more matching vectors 182 corresponding to the user query 164 are retrieved from the vector database 155. Also retrieved from the vector database 155 are metadata of the matching vectors 182. The metadata of the matching vectors 182 include one or more image links 184 to one or more corresponding stored images in the object storage 145. As a result, the one or more image links 184 are retrieved from the vector database 155.

Operation 865 comprises generating a response to the user query based on the one or more vectors. For example, the matching vectors 182 are converted to chunks 186 by a decoding embedding model 185, and the chunks 186 are input as prompts to an LLM 190. The LLM 190 generates a response 192 to the user query 164 based on the chunks 186, i.e., based on the matching vectors 182.

Operation 870 comprises returning the generated response together with the one or more links to the one or more images stored in the object storage. For example, a combined response 178 is returned in response to the user query 164. The combined response 178 comprises the response 192 generated by the LLM 190, and the one or more image links 184 to one or more corresponding stored images in the object storage 145.

In some embodiments, one or more advantages described herein with respect to the user query phase 105 are achievable by the process 800B.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 9:
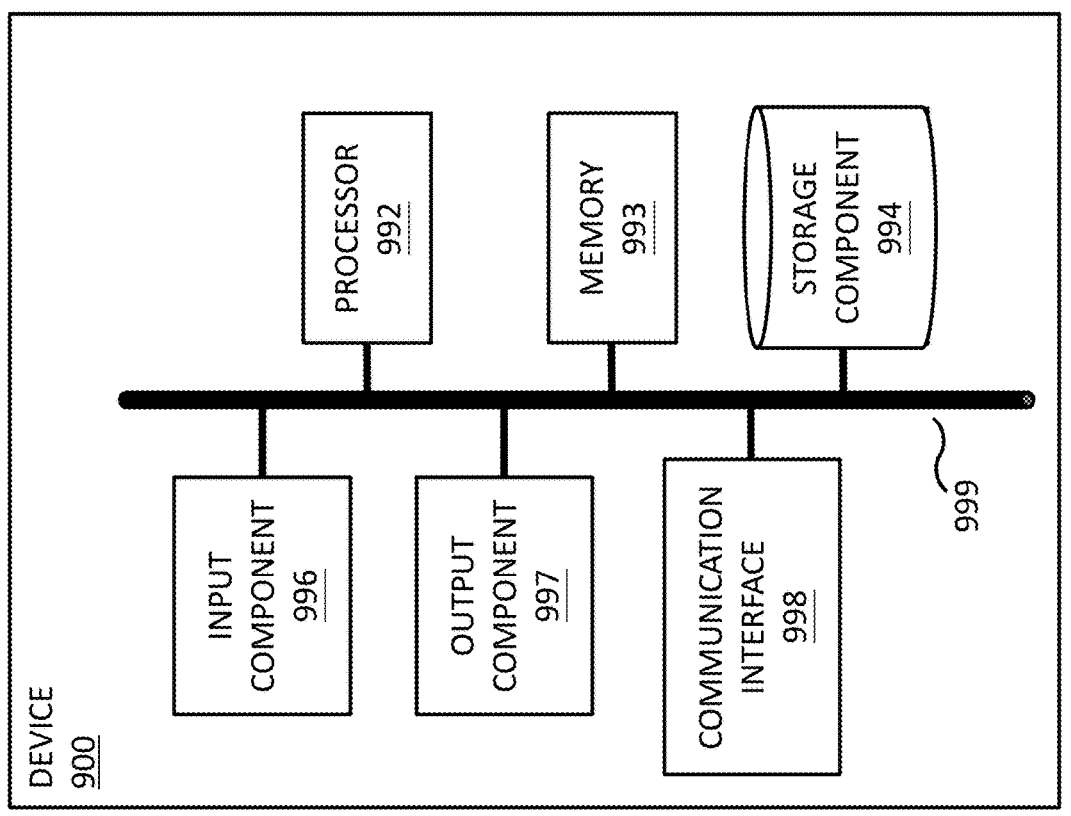
FIG. 9 is a schematic diagram of a device, in accordance with some embodiments.

FIG. 9 is a schematic diagram of a device 900, in accordance with some embodiments. In some embodiments, device 900 configures a system for providing image context for information retrieval, as described herein. In at least one embodiment, device 900 configures one or more units, modules, or components of such a system, as described herein. As shown in FIG. 9, device 900 includes processor 992, memory 993, storage component 994, input component 996, output component 997, communication interface 998, and bus 999.

The processor 992, as used herein, means any type of computational circuit that may comprise hardware elements and software elements. The processor 992 may be embodied as a multi-core processor, a single core processor, or a combination of one or more multi-core processors and/or one or more single core processors, a distributed processing system, or the like. The processor 992 may be a Central Processing Unit (CPU), a graphics processing unit (GPU), an accelerated processing unit (APU), an application-specific integrated circuit (ASIC), or another type of processing component.

Memory 993 includes a non-transitory computer readable medium. memory 993 includes a random-access memory (RAM), a read only memory (ROM), and/or another type of dynamic or static storage device (e.g., a flash memory, a magnetic memory, and/or an optical memory) that stores information and/or instructions for use by processor 992. The memory 993 comprises machine-readable instructions which are executable by the processor 992. These machine-readable instructions when executed by the processor 992 cause the processor 992 to perform one or more method steps of an embodiment described above.

Storage component 994 stores information and/or software related to the operation and use of the device 900. For example, storage component 994 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 996 is configured to receive information, such as user input. For example, the input component 996 may include, but not be limited to, a touch screen display, a keyboard, a keypad, a mouse, a button, a switch, display, a keyboard, a keypad, a mouse, a button, a switch, and/or a microphone. Additionally, or alternatively, the input component 996 may include a sensor for sensing information (e.g., a global positioning system (GPS), an accelerometer, a gyroscope, and/or an actuator).

Output component 997 is configured to provide output information from the device 900. For example, the output component 997 may be, but not limited to, a display, a speaker, an instruction device to an external device, and/or one or more light-emitting diodes (LEDs).

Communication interface 998 is an interface that provides a communication connection to other devices, such as external devices and internal devices. The connection by the communication interface 998 can be a wired connection, a wireless connection, or a combination of wired and wireless connections, and can be a direct connection or an indirect connection via a communication network that exists between the device 900 and other devices. In other words, the standard of the communication interface 998 is not limited.

The bus 999 acts as an interconnect between the processor 992, the memory 993, the storage component 994, the input component 996, the output component 997, and the communication interface 998 of the device 900. The bus 999 may include a wired interconnection or a wireless interconnection.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900. Further, one or more method steps described in any of the embodiments may be performed utilizing a plurality of device 900 in communication with one another.

In aspect [1] in accordance with some embodiments, a system comprises at least one processor, and at least one memory coupled to the at least one processor and configured to store executable instructions executable by the at least one processor to cause the at least one processor to perform operations. The operations comprise: extracting text from a document; vectorizing the extracted text to obtain at least one vector; extracting image data from the document; storing, in an object storage, at least one image in the image data; and storing, in a vector database, the at least one vector with a link to the stored at least one image in the object storage.

In aspect [2] in accordance with some embodiments, in the system described in aspect [1], the operations further comprise performing artifact removal on the extracted image data to obtain the at least one image.

In aspect [3] in accordance with some embodiments, in the system described in any one of aspects [1] to [2], the artifact removal comprises, for each candidate image in the image data, discarding the candidate image, without including the candidate image in the at least one image to be stored in the object storage, in response to determining that any of an image format, an image dimension, an image aspect ratio, mean saturation and a density of detected edges of the candidate image does not satisfy a corresponding predetermined criterion.

In aspect [4] in accordance with some embodiments, in the system described in any one of aspects [1] to [3], the artifact removal comprises, for said each candidate image in the image data, including the candidate image in the at least one image to be stored in the object storage, in response to determining that all of the image format, the image dimension, the image aspect ratio, the mean saturation and the density of detected edges of the candidate image satisfy corresponding predetermined criteria, or that the image format, the image dimension and the image aspect ratio satisfy the corresponding predetermined criteria, and an optical character recognition (OCR) operation detects text in the candidate image.

In aspect [5] in accordance with some embodiments, in the system described in any one of aspects [1] to [4], the artifact removal further comprises, for said each candidate image in the image data, at least one of (a) performing the OCR operation, in response to determining that the image format, the image dimension and the image aspect ratio satisfy the corresponding predetermined criteria, (b) applying an image-blurring filter to the candidate image and then performing the OCR operation, in response to determining that the image format, the image dimension and the image aspect ratio satisfy the corresponding predetermined criteria, or (c) converting the candidate image to a predetermined image mode before checking whether the image dimension satisfies the corresponding predetermined criterion, in response to determining that the image format satisfies the corresponding predetermined criterion, and an image mode of the candidate image is different from the predetermined image mode.

In aspect [6] in accordance with some embodiments, in the system described in any one of aspects [1] to [5], the artifact removal comprises, for said each candidate image in the image data, at least one of applying a Gaussian blur algorithm as the image-blurring filter, performing an edge detection for detecting one or more edges in the candidate image, or using RGB as the predetermined image mode.

In aspect [7] in accordance with some embodiments, in the system described in any one of aspects [1] to [6], the operations further comprise: adding, to metadata of the at least one vector, the link to the stored at least one image, wherein the storing the at least one vector comprises storing, in the vector database, the at least one vector, and the metadata of the at least one vector with the added link to the stored at least one image.

In aspect [8] in accordance with some embodiments, in the system described in any one of aspects [1] to [7], the vectorizing the extracted text comprises: splitting the extracted text into a plurality of chunks; and encoding the plurality of chunks correspondingly into a plurality of vectors, wherein the at least one vector comprises the plurality of vectors, and a chunk location of each chunk among the plurality of chunks in the document is included in metadata of the corresponding vector among the plurality of vectors.

In aspect [9] in accordance with some embodiments, in the system described in any one of aspects [1] to [8], an image location of the at least one image in the document is included in metadata of the at least one image, and the operations further comprise, for each vector among the plurality of vectors: determining whether the chunk location in the metadata of the vector matches the image location in the metadata of the at least one image; adding the image location and the link to the stored at least one image to the metadata of the vector, in response to determining that the chunk location matches the image location; and not adding the image location and the link to the stored at least one image to the metadata of the vector, in response to determining that the chunk location does not match the image location.

In aspect [10] in accordance with some embodiments, in the system described in any one of aspects [1] to [9], the at least one image comprises a plurality of images, each image among the plurality of images is stored in the object storage, and has metadata including: a link to the stored image in the object storage, and an image location of the image in the document, and the operations further comprise, for each vector among the plurality of vectors: determining whether the chunk location in the metadata of the vector matches the image location in the metadata of any image among the plurality of images; for any image among the plurality of images having the image location matching the chunk location, adding the image location and the link to the stored image to an array; adding the array to the metadata of the vector; and storing the vector having the metadata with the added array in the vector database.

In aspect [11] in accordance with some embodiments, in the system described in any one of aspects [1] to [10], the chunk location of each chunk among the plurality of chunks includes a page number of a page including the chunk in the document, the image location of each image among the plurality of images includes a page number of a page including the image in the document, and the chunk location of a vector among the plurality of vectors matches an image location of an image among the plurality of images where the corresponding chunk and the corresponding image are on a same page of the document.

In aspect [12] in accordance with some embodiments, in the system described in any one of aspects [1] to [11], the operations further comprise, in response to a user query, retrieving, from the vector database, one or more vectors corresponding to the user query, and one or more links to one or more images stored in the object storage, wherein the one or more links are included in metadata of the one or more vectors; generating a response to the user query based on the one or more vectors; and returning the generated response together with the one or more links to the one or more images stored in the object storage.

In aspect [13] in accordance with some embodiments, in the system described in any one of aspects [1] to [12], the operations further comprise, in response to the user query, retrieving, using the one or more links, the one or more images from the object storage; and providing, through a user interface, the generated response together with the retrieved one or more images.

In aspect [14] in accordance with some embodiments, in the system described in any one of aspects [1] to [13], the user interface comprises a web page or web browser through which the user query is received from a user, and the generated response together with the retrieved one or more images are provided in response to the user query.

In aspect [15] in accordance with some embodiments, in the system described in any one of aspects [1] to [14], the retrieving the one or more vectors comprises: vectorizing the user query to obtain at least one inquiry vector; and searching the vector database for the one or more vectors that match the at least one inquiry vector.

In aspect [16] in accordance with some embodiments, in the system described in any one of aspects [1] to [15], the operations further comprise: extracting the one or more links to the one or more images from the metadata of the one or more vectors that match the at least one inquiry vector; and removing duplicated links in the extracted one or more links, before returning together with the generated response.

In aspect [17] in accordance with some embodiments, in the system described in any one of aspects [1] to [16], the operations further comprise: extracting the one or more links to the one or more images from the metadata of the one or more vectors; and using the one or more vectors in the generating the response to the user query.

In aspect [18] in accordance with some embodiments, in the system described in any one of aspects [1] to [17], the generating the response to the user query comprises: decoding the one or more vectors to obtain one or more chunks corresponding to the one or more vectors; supplying the one or more chunks to a Large Language Model (LLM); and obtaining the generated response from the LLM in response to the supplied one or more chunks.

In aspect [19] in accordance with some embodiments, a method comprises: extracting text from a document; vectorizing the extracted text to obtain at least one vector; extracting image data from the document; storing, in an object storage, at least one image in the image data; and storing, in a vector database, the at least one vector with a link to the stored at least one image in the object storage.

In aspect [20] in accordance with some embodiments, a non-transitory computer-readable medium has executable instructions recorded thereon that, in response to execution by at least one processor, cause performance of operations comprising: extracting text from a document; vectorizing the extracted text to obtain at least one vector; extracting image data from the document; storing, in an object storage, at least one image in the image data; and storing, in a vector database, the at least one vector with a link to the stored at least one image in the object storage.

In at least some embodiments, a method for providing image context for information retrieval is performed by at least one processor executing instructions in accordance with the foregoing operations, or a device comprising a controller including circuitry configured to perform the foregoing operations.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
at least one processor; and
at least one memory coupled to the at least one processor and configured to store executable instructions executable by the at least one processor to cause the at least one processor to perform operations comprising:
extracting text from a document;
vectorizing the extracted text to obtain at least one vector;
extracting image data from the document;
storing, in an object storage, at least one image in the image data;
adding, to metadata of the at least one vector, a link to the stored at least one image; and
storing, in a vector database,
the at least one vector, and
the metadata of the at least one vector with the added link to the stored at least one image in the object storage, wherein the operations further comprise, in response to a user query,
retrieving, from the vector database,
one or more vectors corresponding to the user query, and
one or more links to one or more images stored in the object storage, wherein the one or more links are included in metadata of the one or more vectors;
generating, using a Large Language Model (LLM), a response to the user query based on the one or more vectors; and
returning the generated response together with the one or more links to the one or more images stored in the object storage,
the retrieving the one or more vectors comprises:
vectorizing the user query to obtain at least one inquiry vector; and
searching the vector database for the one or more vectors that match the at least one inquiry vector, and
the operations further comprise:
extracting the one or more links to the one or more images from the metadata of the one or more vectors that match the at least one inquiry vector; and
removing duplicated links in the extracted one or more links, before returning together with the generated response.

2. The system of claim 1, wherein the operations further comprise:
performing artifact removal on the extracted image data to obtain the at least one image.

3. The system of claim 2, wherein the artifact removal comprises, for each candidate image in the image data,
discarding the candidate image, without including the candidate image in the at least one image to be stored in the object storage, in response to determining that
any of an image format, an image dimension, an image aspect ratio, mean saturation and a density of detected edges of the candidate image does not satisfy a corresponding predetermined criterion.

4. The system of claim 3, wherein the artifact removal comprises, for said each candidate image in the image data,
including the candidate image in the at least one image to be stored in the object storage, in response to determining that
all of the image format, the image dimension, the image aspect ratio, the mean saturation and the density of detected edges of the candidate image satisfy corresponding predetermined criteria, or
the image format, the image dimension and the image aspect ratio satisfy the corresponding predetermined criteria, and an optical character recognition (OCR) operation detects text in the candidate image.

5. The system of claim 4, wherein the artifact removal further comprises, for said each candidate image in the image data, at least one of
performing the OCR operation, in response to determining that
the image format, the image dimension and the image aspect ratio satisfy the corresponding predetermined criteria,
applying an image-blurring filter to the candidate image and then performing the OCR operation, in response to determining that
the image format, the image dimension and the image aspect ratio satisfy the corresponding predetermined criteria, or converting the candidate image to a predetermined image mode before checking whether the image dimension satisfies the corresponding predetermined criterion, in response to determining that the image format satisfies the corresponding predetermined criterion, and an image mode of the candidate image is different from the predetermined image mode.

6. The system of claim 5, wherein the artifact removal comprises, for said each candidate image in the image data, at least one of applying a Gaussian blur algorithm as the image-blurring filter, performing an edge detection for detecting one or more edges in the candidate image, or using RGB as the predetermined image mode.

7. The system of claim 1, wherein the vectorizing the extracted text comprises:

splitting the extracted text into a plurality of chunks; and encoding the plurality of chunks correspondingly into a plurality of vectors, wherein the at least one vector comprises the plurality of vectors, and a chunk location of each chunk among the plurality of chunks in the document is included in metadata of the corresponding vector among the plurality of vectors.

8. The system of claim 7, wherein an image location of the at least one image in the document is included in metadata of the at least one image, and the operations further comprise, for each vector among the plurality of vectors:

determining whether the chunk location in the metadata of the vector matches the image location in the metadata of the at least one image;

adding the image location and the link to the stored at least one image to the metadata of the vector, in response to determining that the chunk location matches the image location; and not adding the image location and the link to the stored at least one image to the metadata of the vector, in response to determining that the chunk location does not match the image location.

9. The system of claim 7, wherein the at least one image comprises a plurality of images, each image among the plurality of images is stored in the object storage, and has metadata including:

a link to the stored image in the object storage, and an image location of the image in the document, and the operations further comprise, for each vector among the plurality of vectors:

determining whether the chunk location in the metadata of the vector matches the image location in the metadata of any image among the plurality of images;

for any image among the plurality of images having the image location matching the chunk location, adding the image location and the link to the stored image to an array;

adding the array to the metadata of the vector; and storing the vector having the metadata with the added array in the vector database.

10. The system of claim 9, wherein the chunk location of each chunk among the plurality of chunks includes a page number of a page including the chunk in the document, the image location of each image among the plurality of images includes a page number of a page including the image in the document, and the chunk location of a vector among the plurality of vectors matches an image location of an image among the plurality of images where the corresponding chunk and the corresponding image are on a same page of the document.

11. The system of claim 1, wherein the operations further comprise, in response to the user query, retrieving, using the one or more links, the one or more images from the object storage; and providing, through a user interface, the generated response together with the retrieved one or more images.

12. The system of claim 11, wherein the user interface comprises a web page or web browser through which the user query is received from a user, and the generated response together with the retrieved one or more images are provided in response to the user query.

13. The system of claim 1, wherein the generating the response to the user query comprises:

decoding the one or more vectors to obtain one or more chunks corresponding to the one or more vectors;

supplying the one or more chunks to the LLM; and obtaining the generated response from the LLM in response to the supplied one or more chunks.

14. A method, comprising:

extracting text from a document;

vectorizing the extracted text to obtain at least one vector;

extracting image data from the document;

storing, in an object storage, at least one image in the image data;

adding, to metadata of the at least one vector, a link to the stored at least one image; and storing, in a vector database, the at least one vector, and the metadata of the at least one vector with the added link to the stored at least one image in the object storage, wherein the method further comprises, in response to a user query, retrieving, from the vector database, one or more vectors corresponding to the user query, and one or more links to one or more images stored in the object storage, wherein the one or more links are included in metadata of the one or more vectors;

generating, using a Large Language Model (LLM), a response to the user query based on the one or more vectors; and returning the generated response together with the one or more links to the one or more images stored in the object storage, the retrieving the one or more vectors comprises:

vectorizing the user query to obtain at least one inquiry vector; and searching the vector database for the one or more vectors that match the at least one inquiry vector, and the method further comprises:

extracting the one or more links to the one or more images from the metadata of the one or more vectors that match the at least one inquiry vector; and removing duplicated links in the extracted one or more links, before returning together with the generated response.

15. A non-transitory computer-readable medium having executable instructions recorded thereon that, in response to execution by at least one processor, cause performance of operations comprising:

extracting text from a document;

vectorizing the extracted text to obtain at least one vector;

extracting image data from the document;

storing, in an object storage, at least one image in the image data;

adding, to metadata of the at least one vector, a link to the stored at least one image; and storing, in a vector database, the at least one vector, and the metadata of the at least one vector with the added link to the stored at least one image in the object storage, wherein the operations further comprise, in response to a user query, retrieving, from the vector database, one or more vectors corresponding to the user query, and one or more links to one or more images stored in the object storage, wherein the one or more links are included in metadata of the one or more vectors;

generating, using a Large Language Model (LLM), a response to the user query based on the one or more vectors; and returning the generated response together with the one or more links to the one or more images stored in the object storage, the retrieving the one or more vectors comprises:

vectorizing the user query to obtain at least one inquiry vector; and searching the vector database for the one or more vectors that match the at least one inquiry vector, and he operations further comprise:

extracting the one or more links to the one or more images from the metadata of the one or more vectors that match the at least one inquiry vector; and removing duplicated links in the extracted one or more links, before returning together with the generated response.

* * * * *